G. S. Norris,
Horseshoes.
No. 97,798.   Patented Dec. 14, 1869.

Witnesses.
H. V. Wyatt
Edmund Masson

G. S. Norris.
By atty A. B. Stoughton.

United States Patent Office.

G. S. NORRIS, OF BALTIMORE, MARYLAND.

Letters Patent No. 97,798, dated December 14, 1869.

---

IMPROVEMENT IN ATTACHABLE AND REMOVABLE CALKS FOR HORSESHOES.

---

The Schedule referred to in these Letters Patent and making part of the same.

---

*To all whom it may concern:*

Be it known that I, G. S. NORRIS, of the city of Baltimore, in the State of Maryland, have invented certain new and useful Improvements in Attachable and Removable Calks for Horseshoes; and I do hereby declare the following to be a full, clear, and exact description of the construction and operation of the same, reference being had to the accompanying drawings, making a part of this specification, in which—

Similar letters of reference, where they occur in the separate figures, denote like parts in all of the drawings.

My invention consists in the devices for attaching a calk to a shoe, as will be hereinafter described, and, as a consequence of the manner of attaching the calk, removing it, without removing the shoe, when it is desirable to do so.

To enable others skilled in the art to make and use my invention, I will proceed to describe the same with reference to the drawings.

Figure 1:
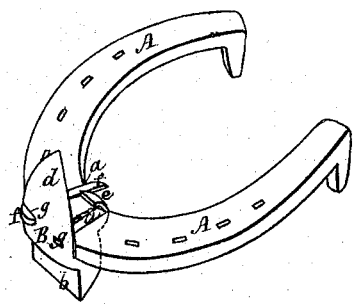
Figure 1 represents, in perspective, a horseshoe, with the calk in question partially attached; one of the nails being omitted, to show the crease in the shoe, which, in this plan, it partially occupies.
Figure 2:
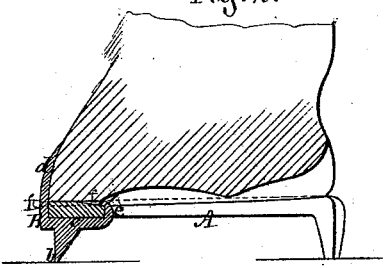
Figure 2 represents a vertical section through the shoe, calk, and hoof of a horse.

If the horseshoe is previously prepared for the reception of the calk, when at any time it should become desirable to use or apply it, the shoe A, as in fig. 1, may have two creases *a a* formed in its upper side, and so made, may be nailed to the hoof in the ordinary manner.

The calk B is made, as shown in the drawings, *b* being the edged or tread-portion that rests upon the ground; *c*, the bearing-portion that rests against the under side of the shoe; and *d* is a shield, which serves the purpose of the ordinary rise or elevation on a horseshoe, to prevent the horse from driving the shoe backward.

A tongue-loop or catch-piece, *e*, is formed on the calk, which catches over the interior edge of the shoe, and when the nails *f f* are driven in through the holes *g*, in the calk or its shield, and into the creases *a a* in the shoe, and clinched over the inner edge of the shoe, the calk is securely fastened to the shoe and foot of the horse.

Figure 4:
Figure 4 represents the calk in perspective, and as detached from the shoe.
Figure 3:
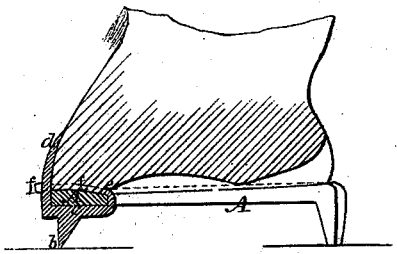
Figure 3 represents a similar section of a slight modification of the attachment shown in fig. 2.

If the shoe has not been previously creased or grooved for the reception of the nails before it was fastened to the hoof, then a slight modification of the mode of fastening may be necessary, as follows:

Instead of rectangular holes through the calk, as at *g*, I can make them round or half round, as at *i*, fig. 4, and with a gimlet or other boring-tool, make corresponding openings through the lower edge of the hoof, or between the hoof and the shoe, for the reception of the nails, which, when clinched against the inner edge of the shoe, as firmly holds the calk to the shoe or hoof of the horse. So that a calk with rectangular, round, or half-round holes, and nails made to fit them, may be united to an ordinary unprepared or uncreased shoe, without removing the shoe from the foot of the animal.

A reverse operation admits of the removal of the calk, when necessary, without disturbing the shoe.

When the creased shoe is used, it affords a better bearing for the nails in the metal of the shoe, and ordinary horseshoe-nails will answer; but when there are no creases, and the nails are entirely supported in the hoof of the animal, then a more rounded and substantial nail is required, more particularly of that portion in contact with the hoof.

The holes in the calks, in both cases, are better of rectangular form, for strength, and may be driven through without the previously-made hole.

In applying this calk to the shoe, one or two thin pieces of rubber should be interposed to prevent hammering and jar. This is the more important when the calks are applied to shoes that are somewhat worn, as by interposing the rubber in one, two, or three, or more layers, the calk can be better fitted to the shoe, without the necessity of making so many sizes of calks, whilst the union between the calk and shoe is thus firm enough, and at the same time elastic or yielding.

Having thus fully described my invention,

What I claim therein as new, and desire to secure by Letters Patent, is—

An attachable and detachable calk, secured to the shoe by the catch-piece *e* and the clinch-nails *f f*, with or without the creases in the shoe, substantially as and for the purpose described.

G. S. NORRIS.

Witnesses:
R. NORRIS, Jr.,
A. B. DAVIDSON.